(12) United States Patent
Dahl-Nielsen et al.

(10) Patent No.: US 12,510,204 B2
(45) Date of Patent: Dec. 30, 2025

(54) APPARATUS FOR CURING A LINER

(71) Applicant: Per Aarsleff A/S, Viby J (DK)

(72) Inventors: Peder Dahl-Nielsen, Viby J (DK); Per Lundgren, Viby J (DK); Esben Meyer, Viby J (DK)

(73) Assignee: Per Aarsleff A/S, Viby J (DK)

( * ) Notice: Subject to any disclaimer, the term of this patent is extended or adjusted under 35 U.S.C. 154(b) by 456 days.

(21) Appl. No.: 18/034,323

(22) PCT Filed: Oct. 27, 2021

(86) PCT No.: PCT/EP2021/079866
§ 371 (c)(1),
(2) Date: Apr. 27, 2023

(87) PCT Pub. No.: WO2022/090333
PCT Pub. Date: May 5, 2022

(65) Prior Publication Data
US 2024/0027013 A1    Jan. 25, 2024

(30) Foreign Application Priority Data

Oct. 28, 2020 (EP) .................................... 20204300

(51) Int. Cl.
*F16L 55/18* (2006.01)
*F16L 101/10* (2006.01)

(52) U.S. Cl.
CPC ........... *F16L 55/18* (2013.01); *F16L 2101/10* (2013.01)

(58) Field of Classification Search
CPC ....... F16L 55/18; F16L 55/16; F16L 55/1608; F16L 55/162; F16L 2101/10
See application file for complete search history.

(56) References Cited

U.S. PATENT DOCUMENTS

2018/0229424 A1* 8/2018 Bichler .................... F16L 55/18
2020/0049301 A1* 2/2020 Rasmussen ........... F16L 55/179

FOREIGN PATENT DOCUMENTS

DE              4401758 C1      5/1995
DE         202015003257 U1      8/2015
(Continued)

OTHER PUBLICATIONS

PCT International Search Report for PCT Application No. PCT/EP2021/079866 mailed Apr. 21, 2022 (7 pages).

(Continued)

*Primary Examiner* — Bryan M Lettman
(74) *Attorney, Agent, or Firm* — Merchant & Gould P.C.

(57) ABSTRACT

The present invention relates to an apparatus and a system for curing a liner extending in a pipeline or at least in part in a branch pipeline, where the liner includes a substance such as a synthetic resin suitable for being curable by exposure to electromagnetic radiation. The apparatus comprises an actuator constituting an electric, hydraulic or pneumatic actuator, and including an actuator member and an actuator axis substantially parallel to the axis of the pipeline when said apparatus is in its intended operational position in said main pipeline. The apparatus also comprises a light head having a light source for emitting electromagnetic radiation for curing said substance, and connected to the actuator member, where the actuator and actuator member are configured for applying a force to the light head in a direction substantially parallel to the actuator axis for displacement of the light head, such that the substance being cured as the light head moves through the pipeline and exposing the substance to electromagnetic radiation.

15 Claims, 8 Drawing Sheets

(56) References Cited

FOREIGN PATENT DOCUMENTS

Figure 1A:
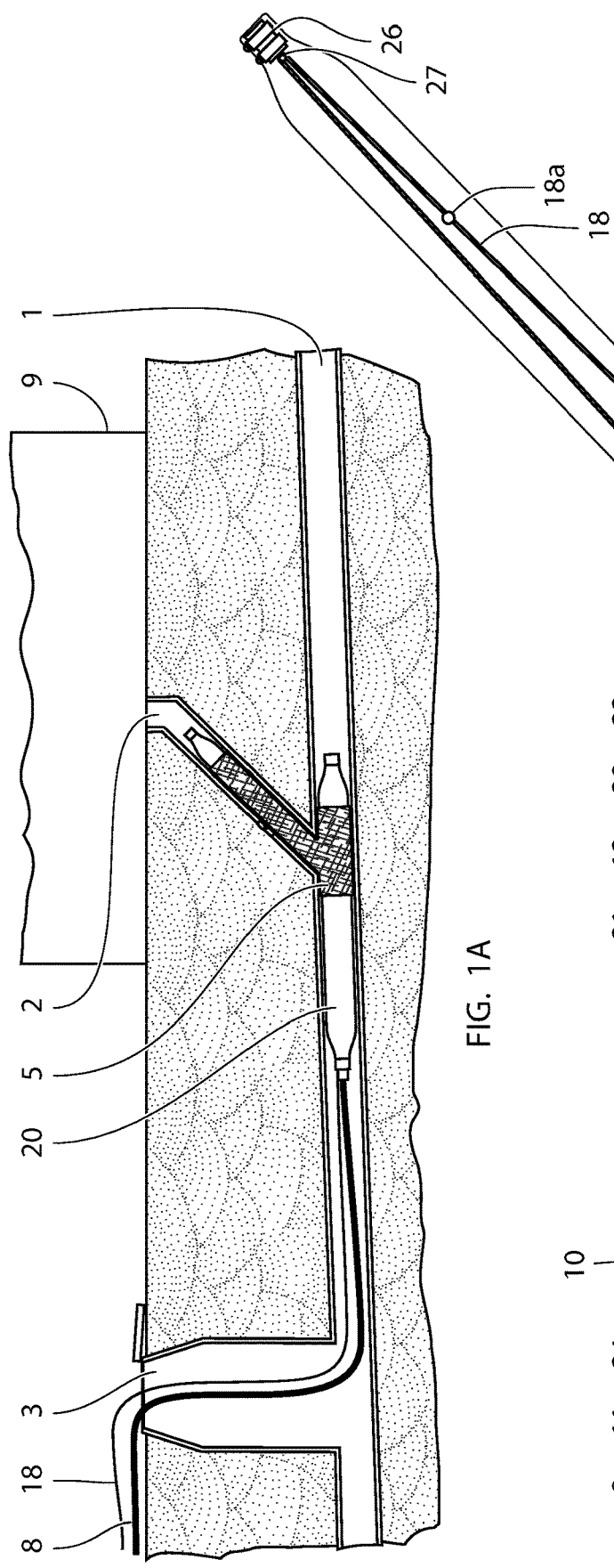

| | | |
|---|---|---|
| EP | 2598787 A2 | 6/2013 |
| KR | 20100094824 A | 8/2010 |
| WO | 2004104469 A1 | 12/2004 |

OTHER PUBLICATIONS

Written Opinion of the International Searching Authority for PCT Application No. PCT/EP2021/079866 mailed Apr. 21, 2022 (9 pages).

* cited by examiner

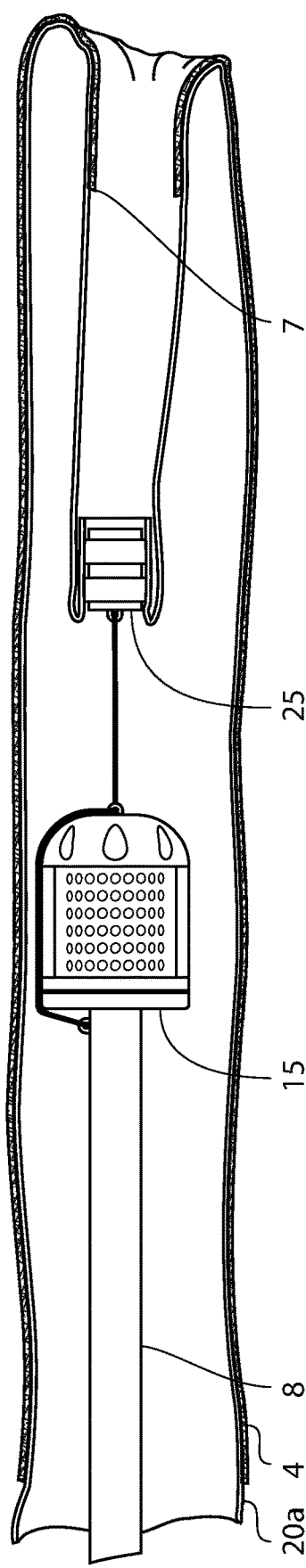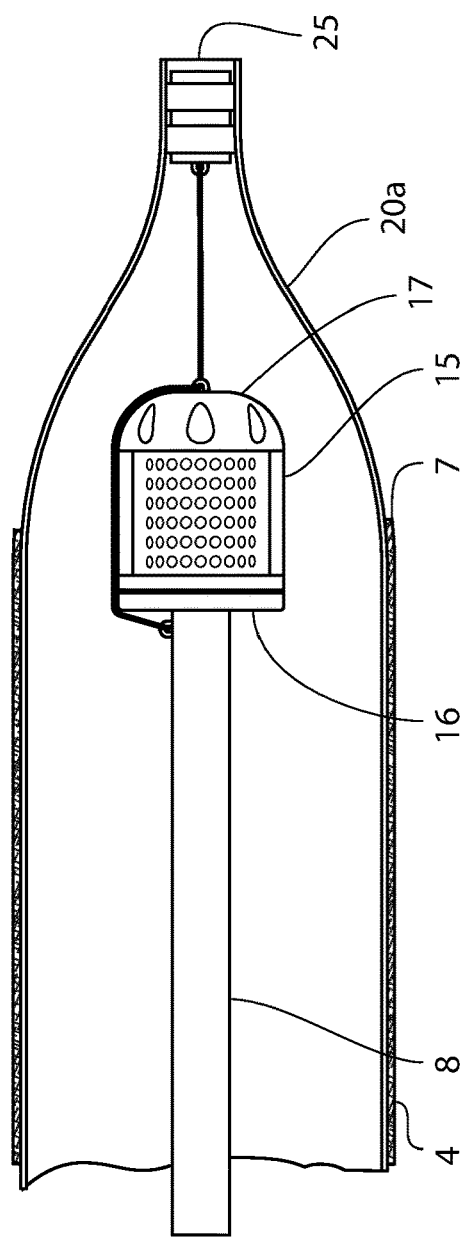
FIG. 5A
FIG. 5B

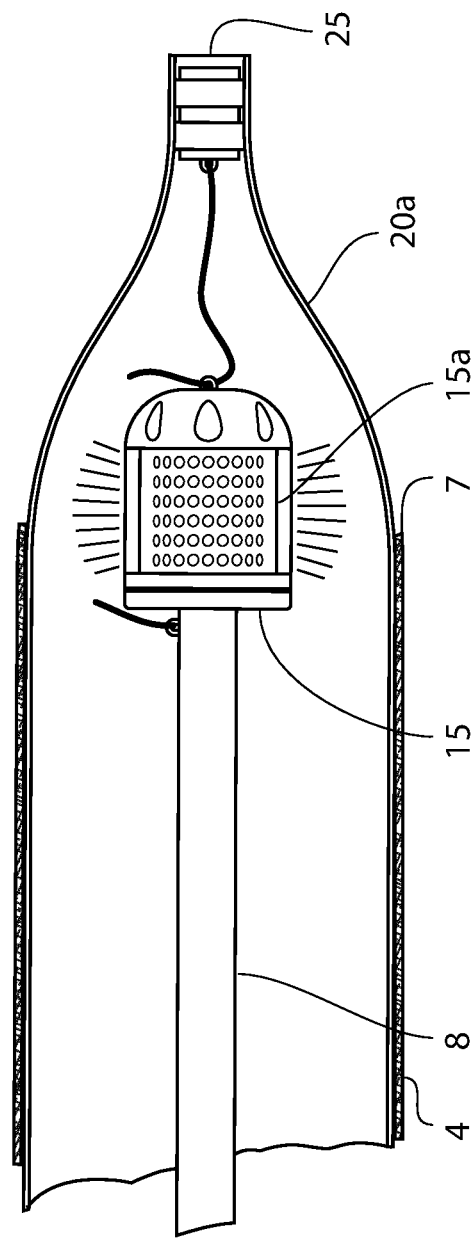

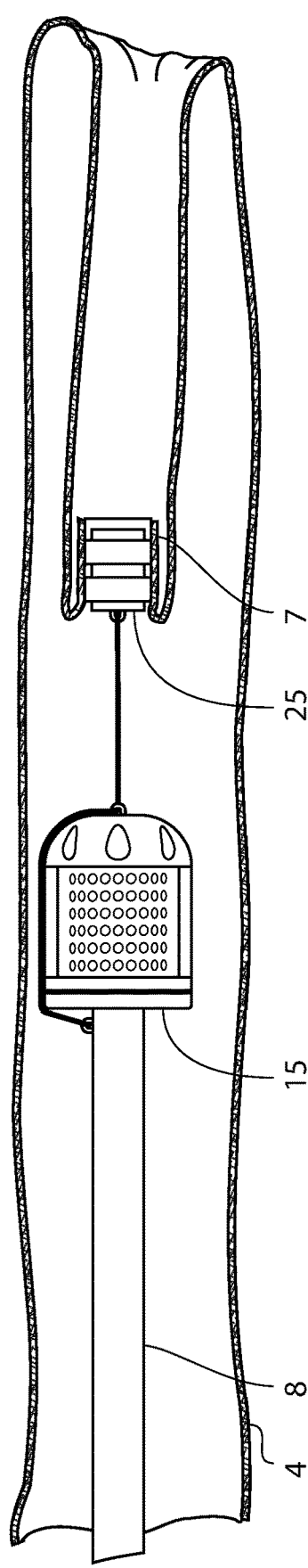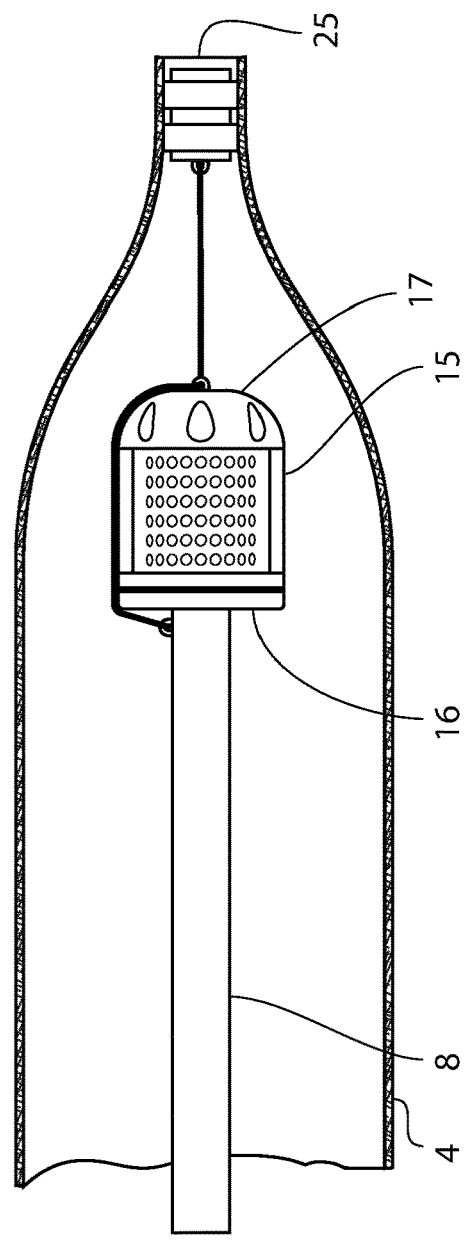
FIG. 6A
FIG. 6B

APPARATUS FOR CURING A LINER

This application is a National Stage Application of PCT/EP2021/079866, filed 27 Oct. 2021, which claims the benefit of Serial No. No. EP 20204300.6 filed on 28 Oct. 2020, and which applications are incorporated herein by reference. To the extent appropriate, a claim of priority is made to each of the above disclosed applications.

The present invention relates to an apparatus and a system for curing a liner extending in a pipeline or at least in part in a branch pipeline including a light head emitting electromagnetic radiation.

BACKGROUND ART

Pipelines are typically made of robust and heavy materials such as steel, concrete, clay or very rigid plastic. Exchanging existing pipelines is usually a costly process, especially when the pipeline is located underground, such as sewage pipelines. It is therefore preferable to renovate the defective pipeline instead of replacing it. Typically, a process called relining is used to renovate a defect pipeline, such as a leaking sewage pipeline, in which process an elongated liner is inserted into the existing pipeline. The liner is made of a flexible and resin-impregnated fiber material and shaped like a tube having approximately the same diameter as the pipeline.

The liner may be installed in a pipeline by means of air-pressure or inflatable "balloons", and the resin in the liner can be cured by means of heat, e.g. vapor or electromagnetic radiation.

The liner is allowed to cure after being inserted into the pipeline. When cured, the liner will be robust, solid and fluid-tight. The inner surface of the liner will be very smooth, i.e. have a low surface roughness. Due to the decreased roughness, the flow rate with the liner installed will typically be improved compared to the flow rate without liner, even if the liner reduces the effective flow area of the pipeline.

A pipeline system typically comprises several pipeline intersections, forming main pipelines and branch pipelines extending from the main pipelines. A branch pipeline typically forms a "T-shape" with the main pipeline and is referred to as a "T-piece". Branch pipelines joining the main pipeline constitute a major problem in connection with the above technology. A branch pipelines may e.g. be used to connect a building to the pipeline system. A main pipeline often has a plurality of branch pipes along its elongation. When lining the main pipeline, the liner will block access to the branch pipe. Access to the branch pipe has to be re-established after curing the liner by cutting a hole in the liner at the position of the junction between the main pipeline and the branch pipeline. Such a hole constitutes a void in the liner at the position of the branch pipe junction, and such a void in the liner may cause problems at a later time since the fluid-tight properties of the liner are compromised at the location of the hole. There is thus a significant risk of leakage at the location of the hole.

Further, the branch pipeline often requires relining as well, i.e. the full length or a part of the length between the main pipeline and the user location, e.g. a building. It would thus be an advantage to be able to both apply a seal at the junction between the relined main pipeline and the branch pipeline, and simultaneously to reline the complete branch pipeline, or a part of the branch pipeline.

During installation, the resin-impregnated fiber material of the liner is typically cured by exposure to electromagnetic radiation, typically UV-light, and the light emitting devices are moved through the liner by a device denoted as a "light train".

In connection with the "light trains" used in the prior art for moving the light sources in and out of the pipelines, the drive system, cooling system and electrical system require several separate cables and wires which may be difficult to install and overview.

DISCLOSURE OF THE INVENTION

An object of the present invention is to provide a simpler system for mounting and curing a liner in a pipeline by providing as less complicated system for moving a source for electromagnetic radiation through the pipeline.

A further object is to provide an alternative solution for mounting a liner and moving a source for electromagnetic radiation through a pipeline.

These objects and other objects will be evident from the disclosure of the invention. The invention is defined in the claims.

In a first aspect, the present invention relates to an apparatus for curing a liner extending in a pipeline or at least in part in a branch pipeline,
  said liner including a substance such as a synthetic resin suitable for being curable by exposure to electromagnetic radiation,
  said apparatus comprising:
    an actuator constituting an electric, hydraulic or pneumatic actuator, said actuator including an actuator member,
  said actuator having an actuator axis substantially parallel to the axis of said main pipeline when said apparatus is in its intended operational position in said main pipeline,
    a light head having a light source for emitting electromagnetic radiation for curing said substance,
  said light head being connected to said actuator member,
  said actuator and actuator member are configured for applying a force to said light head in a direction substantially parallel to said actuator axis for displacement of said light head in said pipeline such that said substance is cured as said light head moves through said pipeline and exposing said substance to electromagnetic radiation.

The apparatus is adapted for curing a liner by means of electromagnetic curing. The actuator and the actuator member are connected such that the actuator member can be activated for axial movement along the actuator axis by means of the actuator, such that the light head can move along the length of the liner to be cured.

The liner may be felt or unwoven polymer fiber material and impregnated with a curable resin.

The branch pipeline is preferably connected to a main pipeline at a junction.

In an embodiment, the apparatus comprises a first cable constituting a guide cable interconnected to the light head or the actuator member such that when pulling the guide cable, the light head is guided away from the actuator axis for directing the light head into the branch pipe from the main pipeline when the apparatus is in its intended operational position in the main pipeline at the junction.

In an embodiment, the liner is a hat or T shaped liner. By use of the guide cable it is possible to guide the light head to cure a T shaped liner in the part present in the main pipeline and in the branch pipe.

In an embodiment of the apparatus, the actuator member is displaced with respect to the actuator when the actuator is actuated. Thus, the actuator member can be displaced along the length of a liner, thereby allowing the light head connected to the actuator member to cure the liner.

In an embodiment, the actuator and actuator member are configured such that the light head moves parallel to the actuator axis when no pull is applied to the guide cable. When no pull is applied, the light head will move in a substantially straight line, which is often suitable for curing a liner in a main pipeline The apparatus preferably comprises a second cable interconnected to the actuator member or the light head for stopping the light head from moving when the actuator is actuated. The second cable may be used to control the movement of the light head and the second cable may also include electric wiring for providing the light head with electric power.

The invention also relates to an apparatus for curing a liner extending at least in part in a branch pipeline, such as a hat or T shaped liner, said liner including a substance such as a synthetic resin suitable for being curable by exposure to electromagnetic radiation, said branch pipeline being connected to a main pipeline at a junction, said apparatus comprising:

a light head having a light source for emitting electromagnetic radiation for curing said synthetic resin, an inflatable housing having a connector at one end and a plug in the end opposite to the connector and a branch plug in a branch of said housing, a guide cable interconnected to said light head such that when pulling said guide cable, said light head is guided in a direction towards said branch plug when said apparatus is in its intended operational position in said main pipeline at said junction, said branch plug including an eye or loop for accommodating said guide cable, such that said guide cable moves through said eye or loop when being pulled, said guide cable including a stop to be stopped by said eye or loop for pulling said branch plug out of said branch pipe.

The apparatus can be used within an inflatable housing or bladder for curing a liner, such as a T shaped liner. The inflatable housing or bladder is preferably transparent, e.g. made from transparent polymer material.

In an embodiment of the apparatus, the actuator member is flexible for bending the actuator member at an angle up to 90 degrees with respect to the actuator axis. The flexibility and bending of the actuator member makes it possible to guide the actuator member carrying the light head into a branch pipe.

In an embodiment, the actuator includes a flexible rod constituting an inner tube or inner cylinder. The flexible rod makes it easier to guide the light head into a branch pipe, and preferably the light head is connected to the flexible rod.

The apparatus also comprises an embodiment in which the actuator includes a barrel constituting an outer tube or outer cylinder for building fluid pressure for facilitating mechanical operation of the actuator member, and preferably the barrel has a barrel axis substantially parallel to the actuator axis. The barrel allows for use of relatively high pressure in the actuator member.

In an embodiment, the actuator or barrel has a barrel connector for fluid connection to a compressor during operation for supplying compressed fluid to the actuator or barrel. The fluid may be air or liquid, such as oil.

Preferably the barrel accommodates at least part of the flexible rod. Thus, the rod can be moved by fluid pressure build-up in the barrel.

Preferably, the actuator has an extended state such that the flexible rod is fully extended from the barrel in the extended state. The extended state facilitates the curing of a liner e.g. a liner in a branch pipe.

Preferably, the flexible rod extends out from the barrel when pressure is applied to the actuator.

Preferably, substantially parallel defining two directions not deviating from each other with more than 20 degrees such as 10 degrees or 5 degrees. Thus, the features "substantially parallel to the axis of said main pipeline" and "substantially parallel to said actuator axis" means that the item substantially parallel with the main pipeline or the actuator axis do not deviate more than 20 degrees from parallel in the longitudinal direction along the length of pipeline or actuator axis.

The apparatus comprises an embodiment where the actuator comprises a base member. The base member ensures that the actuator can be connected with the connector of the apparatus.

In an embodiment of the apparatus according to the invention, the light head comprises a plurality of LED's for irradiating electromagnetic radiation. LED's may irradiate electromagnetic radiation in a stable and cost-effective manner.

In an embodiment, the apparatus comprises a housing having a connector at one end and a plug in the end opposite to the connector and a branch plug in a branch of the housing. The housing is adapted for forming a T-shape.

Preferably, the housing includes a bladder. The bladder may be inflatable and the housing may itself constitute the inflatable bladder.

Preferably, the bladder has a wall of a material permeable to said electromagnetic radiation. Thus, the bladder is preferably made from transparent material, e.g. polymer material.

In an embodiment of the apparatus, the bladder is adapted for facilitating a pressure on the liner when the housing is inflated by a pressurized fluid such that the liner is pressed against a pipeline wall. Thereby, it is possible to cure the liner in a position where the liner has a tight connection with the pipeline wall.

In an embodiment, the actuator and the actuator member are arranged such that when a force is applied to the actuator member the light head is directed in a direction substantially parallel to the direction from the connector to the plug.

In an embodiment, the branch plug is arranged to be positioned in the branch pipe during intended operation of said apparatus.

Preferably, the apparatus comprises a compressor for supplying a fluid such as a compressed fluid to the actuator. Thus, the actuator member and flexible rod can guide the light head to a desired a position.

In an embodiment, the compressor supplies a fluid such as a compressed fluid to the housing for inflating the housing. The compressor may then deliver compressed fluid for operating the actuator and inflating the housing, thus, operating the apparatus in a cost-effective manner.

In an embodiment of the apparatus according to the invention, the connector and the plug are connected together by means of a stiffener for structurally stiffening the housing. The stiffener serves to maintain the shape of the housing when the housing is not inflated or only partly inflated.

When the light head is guided into the branch of the housing by means of the guiding cable, the branch plug may be used to facilitate the guiding, and in an embodiment, the branch plug includes an eye or loop for accommodating the guiding cable such that the guiding cable moves through the eye or loop when being pulled.

Preferably, the stop has a size greater than the eye or loop, and preferably, the stop is positioned on the guide cable between the light head and the eye or loop. Thus, the stop may serve to control the motion of the light head into the branch of the housing.

In an embodiment, the guiding cable includes a stop to be stopped by the eye or loop for pulling said branch plug out of said branch pipe. The interaction between the stop and the eye or loop then serves to facilitate the removal of the branch of the housing from the branch pipe when the liner has been cured.

The apparatus includes an embodiment comprising no more than two cables connected to the light head or the actuator member. Thus, the embodiment provides a solution where the apparatus can be operated in a simple manner.

In an embodiment, the apparatus comprises a single cable such as no more than one cable inside said housing, but outside said actuator. This allows for a simple operation of the apparatus.

The present invention also relates to a system for curing a liner extending in a pipeline,
   said liner including a substance such as a synthetic resin suitable for being curable by exposure to electromagnetic radiation,
   said liner having an open end,
   said system comprising:
      a light head having a light source for emitting electromagnetic radiation for curing said synthetic resin,
      an inflatable housing, said light head being positioned inside said inflatable housing when said system being in its intended operational position in said pipeline,
      a connector for releasably connecting said light head with said inflatable housing at said open end of said liner such that said light head moves into said pipeline with said inflatable housing when said inflatable housing is inserted into said pipeline,
      a first cable interconnected to said light head for pulling said light head out of said liner when said light head is released from said liner.

In an embodiment, the system comprises an inversion drum, the inversion drum having an exit for inverting the liner out of the exit, and an opening such that when the liner being inverted a distance into the pipeline and the open end being at the opening, the opening being opened and the light head being releasably connected with the inflatable housing.

The invention further relates to a system for curing a liner extending in a pipeline, comprising an inversion drum including said liner for positioning said liner in said pipeline,
   said liner including a substance such as a synthetic resin suitable for being curable by exposure to electromagnetic radiation,
   said liner having a proximal end and a distal end, said proximal end being closer to said inversion drum than said distal end when said liner being in its intended position in said pipeline,
   said system comprising:
      a light head having a light source for emitting electromagnetic radiation for curing said synthetic resin,
      a connector for releasably connecting said light head with said liner at said distal end of said liner such that said light head is moved into said pipeline with said distal end when said liner is inserted into said pipeline,
      a first cable interconnected to said light head for pulling said light head out of said liner when said light head is released from said liner.

In an embodiment of the system, the inversion drum has an exit for inverting the liner out of the exit, and an opening such that when the liner is inverted a distance into the pipeline and the distal end is at the opening, the opening is opened and the light head is releasably connected with the liner. Thus, the inversion drum serves to mount the liner and the light head in the pipeline.

In an embodiment, the first cable is a cable for supplying electricity to the light head or a wire or a rope.

The system also includes an embodiment where the liner includes an open end at the distal end when the liner is in its intended position in the pipeline, the liner is opened at the distal end preferably after the liner being cured.

In an embodiment, the connector comprises an electric fuse. The electric fuse may be used when the light head is to be released from the liner.

In an embodiment, the connector comprises a magnet. The magnet may serve to attach an actuator to the connector.

The light head comprises a distal end and a proximal end, and preferably, the distal end is closer to the open end than the proximal end.

Preferably, the connector is connected to the light head such that the connector is closer to the proximal end than the distal end.

In an embodiment of the system, the connector includes a second cable, and the second cable extends across the light source for melting the second cable when the light source emits electromagnetic radiation, such that the light head is released. When the cable is melted and the light head released, the light head can be pulled through the liner and cure the resin in the liner.

The present invention provides several embodiments including methods for improved curing of a liner of T-liner in a pipeline and branch pipe. The invention also provides an apparatus which is easier and uncomplicated to use than the prior art devices, thus, lowering the cost for curing liners in pipelines

DETAILED DESCRIPTION OF THE INVENTION

Figure 1B:
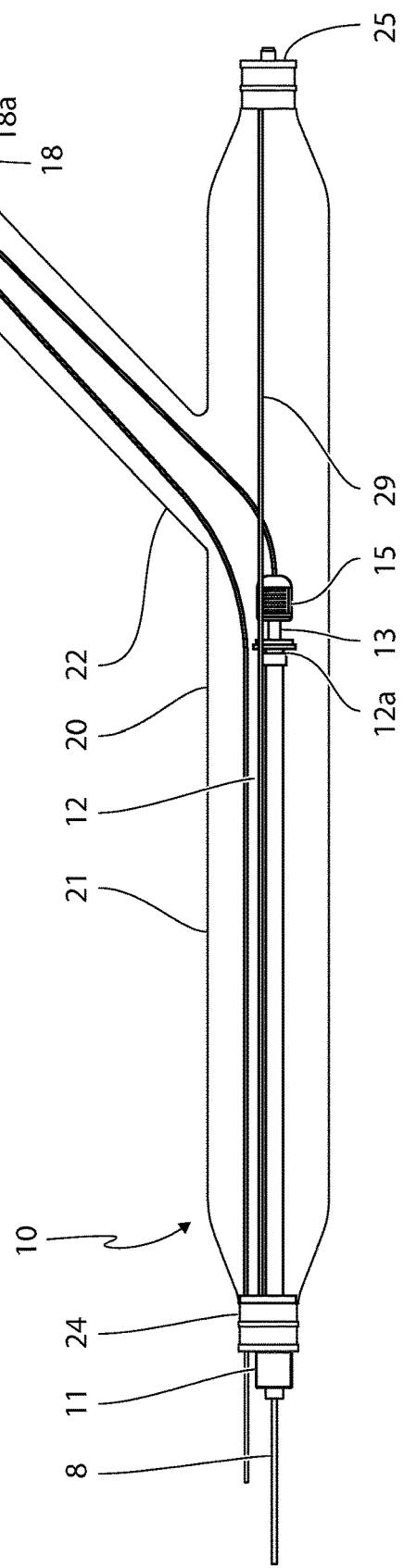
Figures 2A, 2B:
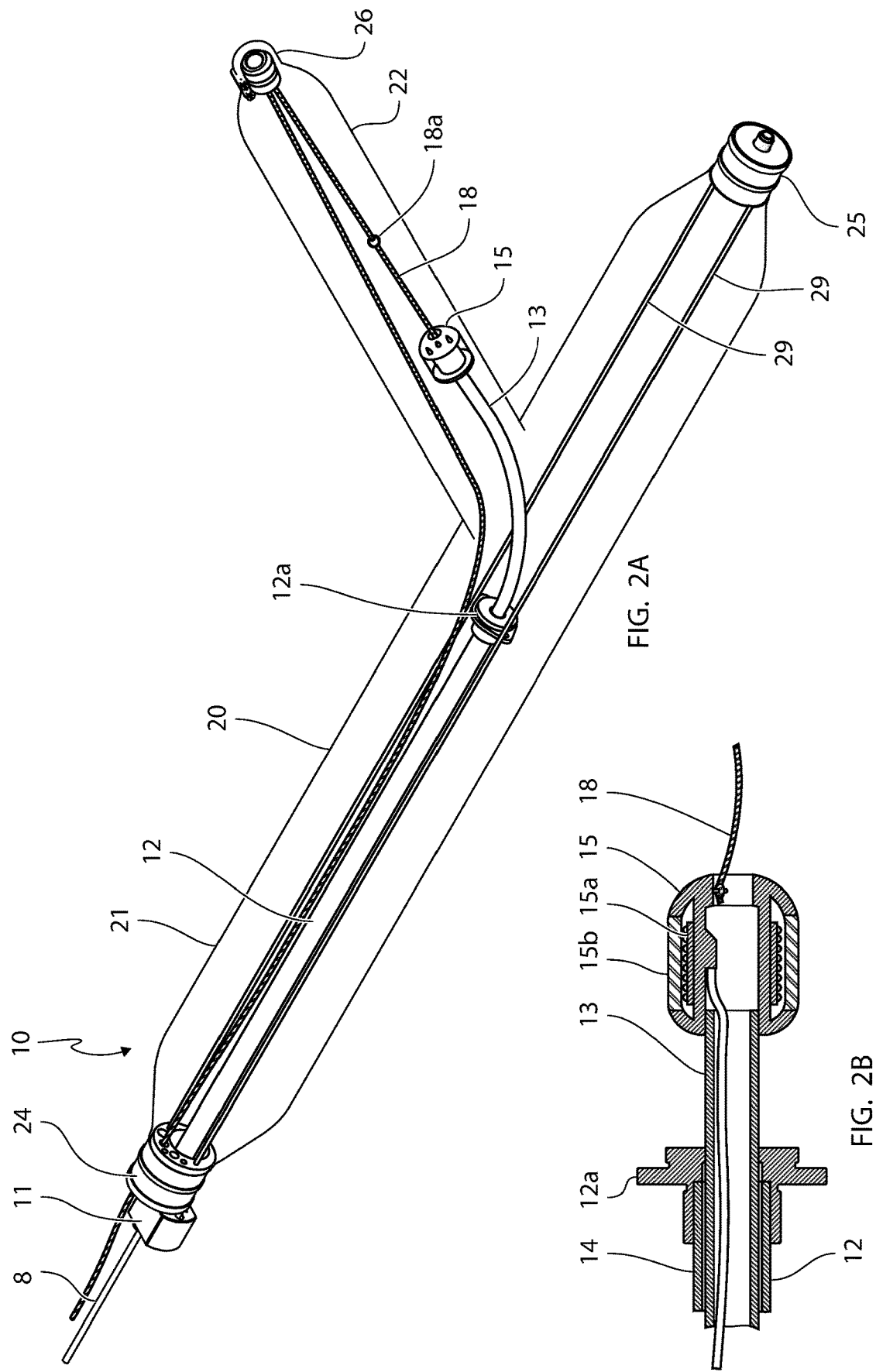
Figure 3:
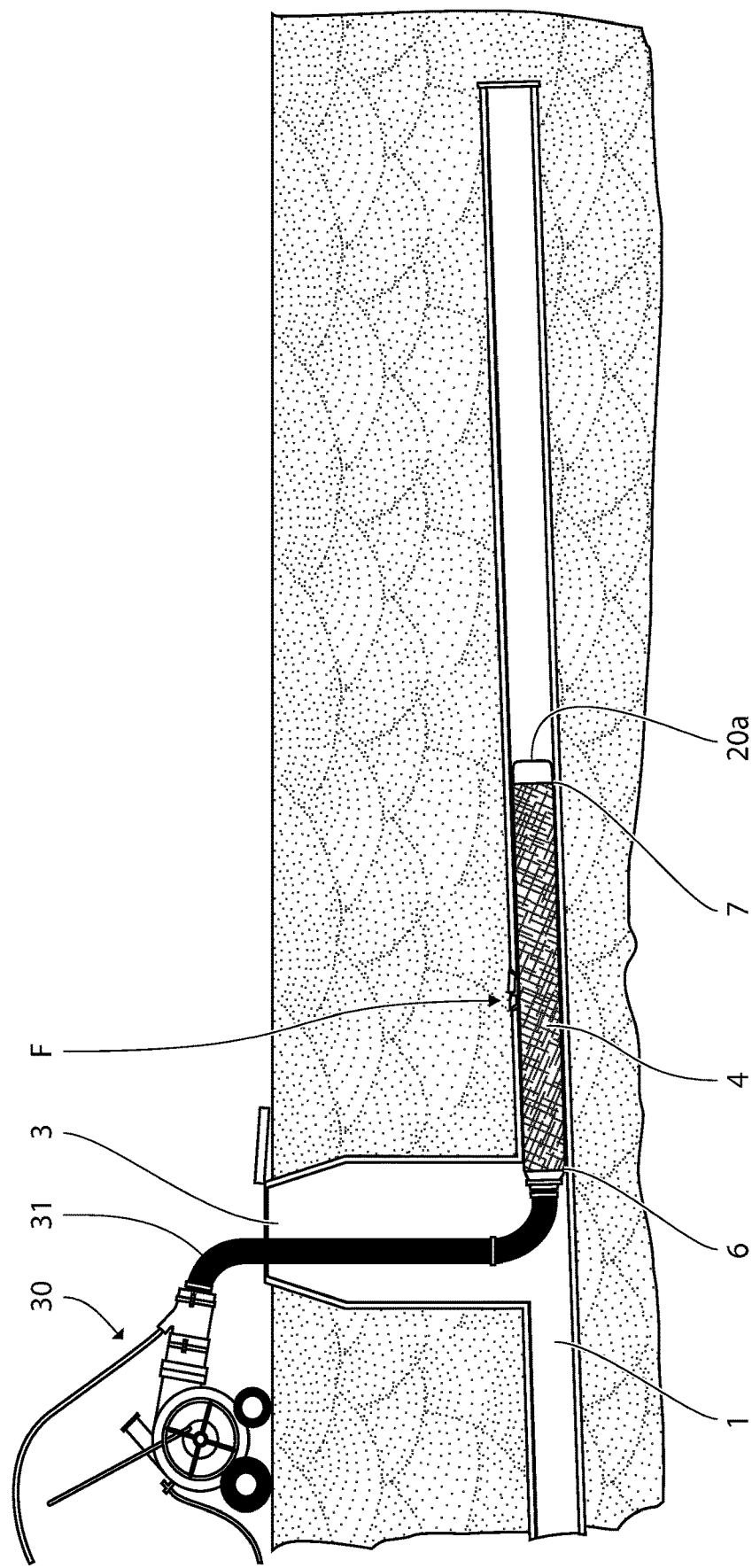
Figure 4:
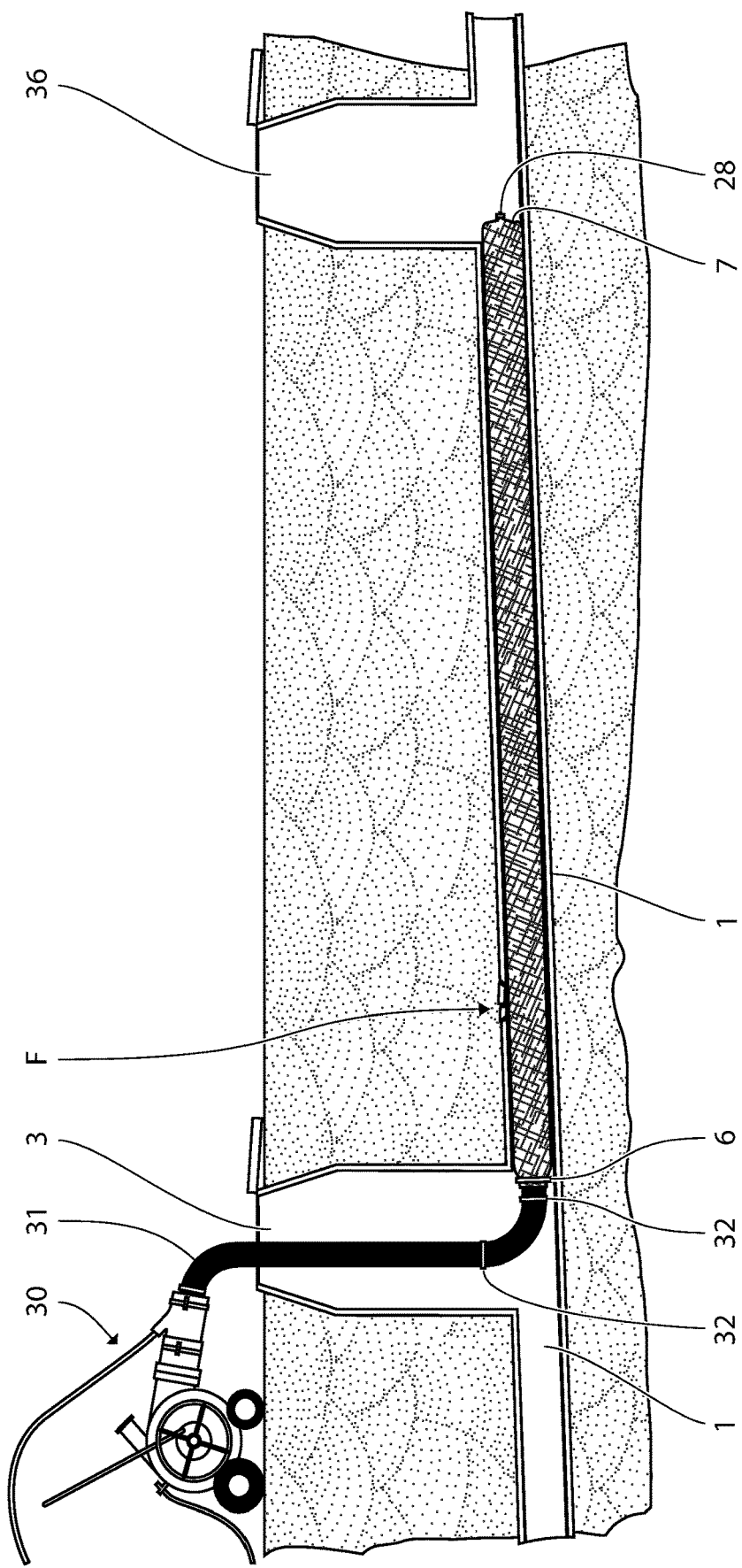
Figure 6C:
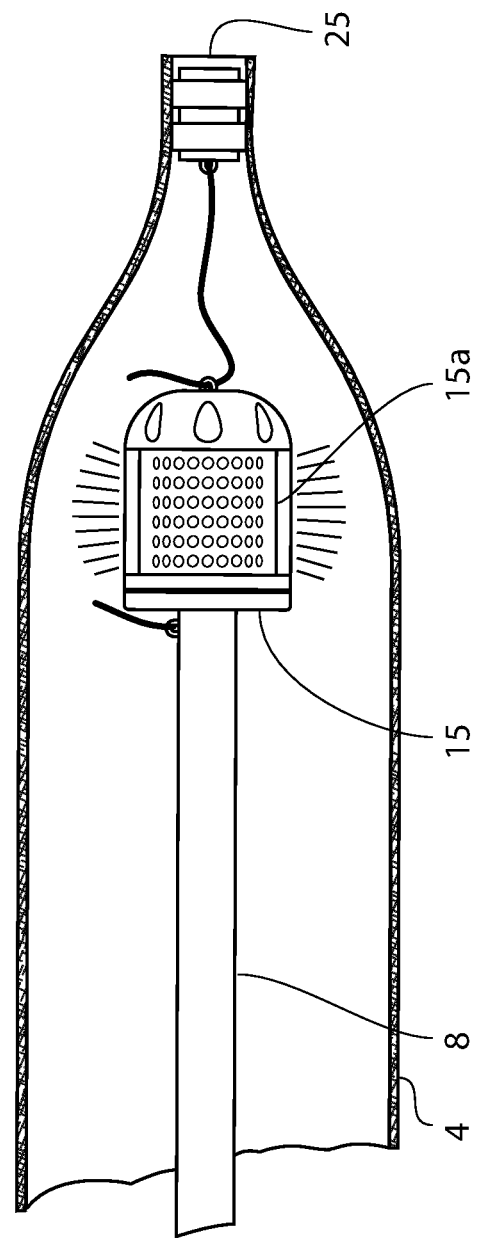

The invention will now be described in further details with reference to drawings in which:
   FIG. 1A shows an overview of a sewer system;
   FIG. 1B shows an apparatus according to the invention;
   FIG. 2A shows the apparatus with branch function;
   FIG. 2B shows details of the light head;
   FIG. 3 shows a liner in an "endless" configuration;
   FIG. 4 shows a liner between two manholes;
   FIG. 5A shows the light head in a bladder;
   FIG. 5B shows the light head in a bladder;
   FIG. 50 shows the light head in a bladder;
   FIG. 6A shows the light head in a liner;
   FIG. 6B shows the light head in a liner;
   FIG. 6C shows the light head in a liner.

The figures are only intended to illustrate the principles of the invention and may not be accurate in every detail. Moreover, parts which do not form part of the invention may be omitted. The same reference numbers are used for the same parts in the figures.

FIG. 1A shows a sewer system comprising a pipeline 1 and a branch pipe 2 connecting the pipeline 1 with a house 9. The system further comprises a manhole 3 allowing access to the pipeline 1.

In the pipeline 1 and the branch pipeline 2 is located a T-liner 5 mounted on an inflatable housing 20. Inside the inflatable housing is an apparatus for curing the liner (not visible in FIG. 1). The apparatus may be driven by pressurized air. The apparatus is via the manhole 3 connected with control devices at ground level by means of guide cable 18 and a (second) cable 8.

FIG. 1B shows the apparatus 10 inside the transparent inflatable housing 20. The apparatus 10 comprises an actuator 11 and an actuator member 13. The actuator may be a hydraulic actuator having a base and an outer cylinder 12 in which the actuator member moves inside. The actuator member may be a flexible rod such that it can bend and move into the branch pipeline.

The apparatus also includes a light head 15 attached to the actuator member. At the end of the actuator member 12, a packing 12*a* is mounted to establish a fluid tight connection between the outer cylinder 12 and the actuator member 13.

The second cable may constitute a power cable for leading electric wires to the apparatus. The power cable may also lead pressurized air for inflating the inflatable housing and actuate the apparatus, i.e. for powering the actuator and light head.

The inflatable housing 20 comprises a main housing 21 and a branch housing 22. The inflatable housing 20 further comprises a connecter 24 to which the actuator 11 is connected. Opposite the connector 24, in the main housing 21, the inflatable housing comprises a plug 25. A (pair of) stiffeners 29 extend between the connector 24 and plug 25 and attached to the connecter 24 and the plug 25 to maintain the structure of the main housing 21. In the branch housing 22.

The inflatable housing 20 comprises a branch plug 26 in the distal end of the branch part.

The branch plug 26 includes a plug member such as an eye 27 for supporting movement and change of direction of the guide cable 18.

The plug member and the stop 18*a* are designed with respect to each other such that the movement of the guide cable through the plug member is stopped when the stop is at the plug member. For example, the plug member may have an eye with a diameter smaller than that of the stop.

The guide cable 18 is attached to the actuator member or light head 15 and passes through the eye 27 in the branch plug 26 to the connector 24, after which the guide cable 18 continues to ground level for interaction with a control device.

FIG. 2A illustrates that the light head 15 is guided into the branch housing 22 by pulling the guide cable 18.

Pressure may be applied to the actuator such that the actuator member moves. The speed of the actuator member may be controlled by holding the power cable and give slack.

As the light head is at the opening into the branch, the guide cable may be pulled causing the flexible rod to the change direction and be directed into the branch as it is forced away from the actuator by pressure.

FIG. 2B shows the light head 15 and attachment to the actuator member 13 in more details. The light head 14 is fastened to the flexible rod 13, which is able to slide in the barrel (outer cylinder) 14. The end of the actuator member comprises a packing 12*a* through which the flexible rod passes.

The light head 15 is attached to the guide cable 18, but also to the second (power) cable running inside the flexible rod 13. The second cable comprises electric wiring for the light head 15 and also functions as a pulling cable which can pull the light head toward the packing 12*a* while the flexible rod 13 is dragged into the barrel 14 of the actuator member 12. As seen in FIG. 2A, the light head 15 is mounted with LED panels 15*a* covered with transparent covers 15*b*.

The apparatus may also be used for short liners/part-liners where it is mounted to an inflatable housing without a branch. For such a use, the guide cable may be omitted since the light head is only to move back and forth along the axis of the actuator.

FIG. 3 shows a liner 4 mounted in a pipeline 1 with a fracture F which needs repair. The figure shows what is referred to as "endless shoot" within the art meaning that in the vicinity of the distal end 7 of the liner 4 there are no branches or manholes for reaching the liner from ground level.

The inflatable housing constitutes a tube with the liner mounted outside the tube such that the liner extends on both sides of the fracture. When pressure is applied in the tube, the tube expands and applies pressure to the liner pressing the liner against the pipe.

The tube is attached to the inversion drum 30 and passes down the manhole 3 into the pipeline 1. In FIG. 5, details will be explained in respect of curing the liner in the "endless shoot" configuration.

FIG. 4 shows a situation where the liner 4 is configured between a first manhole 3*a* and a second manhole 3*b* for repairing a fracture F in the pipeline 1.

When the liner 4 is cured, a part of the liner at the distal end 7 (furthest from the inversion drum) is cut off providing the liner 4 with open ends such that fluid may flow freely though the liner 4.

Details of curing the liner are shown in FIG. 6.

FIGS. 5A, 5B and 5C illustrates how the liner 4 in FIG. 3 is cured.

FIG. 5A illustrates a liner 4 mounted on an inflatable (bladder) tube 20*a*. The tube is not fully expanded and a part of the liner 4 at the distal end 7 is everted (and positioned in the tube.

At the distal end (opposite the end where the tube-liner assembly is inserted into the pipe), the liner is open.

During the expansion of the tube, the everted liner will be inverted and located on the outer surface of the tube and facing the pipe (not shown).

FIGS. 5B and 5C shows the situation where the tube is fully expanded with the liner 4 on its outer surface.

In the tube, the light head for curing the liner is placed, i.e. curing the resin of the liner (the liner may be of felt material with synthetic resin).

In order to get the light head to cure the entire liner, the light head is to be positioned at the distal end—there may be no access to the pipe at the distal end or further down the pipe.

The light head is removably attached to the distal end of the tube, for example to the (end) plug 25 of the tube. Removably attached means that the light head is attached to the tube in such a way that it may be released from the tube and pulled back through the tube by pulling the (power) cable, such that the light head may emit electromagnetic radiation onto the liner as it moves back through the tube.

As the tube-liner assembly is inverted out of the inversion drum, the drum is opened when the plug at the end of the tube is at an access opening of the inversion drum so that the plug can be accessed, and the light head attached.

As the light head has been removably attached to the tube, the drum is closed, and pressure is applied in order to invert the tube-liner assembly all the way into the pipe.

The light head is shown attached by means of a line extending across the (light) emitters of the light head. The line may be of a material such that when exposed to the light emission for a period of time, the heat may cause the line to melt/break such that the light head is released from the tube.

The line may be attached to the (proximal) end of the light end (opposite the plug) and the line may extend through a guide eye at the distal end of the light head to ensure that the line is close enough to the light emitters.

FIG. 5C shows the situation where the LED panel 15a in the light head 15 is activated for curing the liner 4. The energy released by the LED panel will fuse the part of the line present on the surface of the light head 15 and the line breaks.

When the line breaks, the light head 15 is released and can be moved through the entire length of the liner 4 to cure the liner. When the entire length of the liner 4 is cured by the light head 15, the tube is withdrawn from the liner.

Other means for attaching or connecting the light head to the tube (or liner) may be used. For example, an electric fuse or a magnetic system including a magnet.

However, the light head is to be attached (independent on the specific attachment means) to the tube, as the end of the tube is at an access opening of the inversion drum.

FIGS. 6A, 6B and 6C illustrates the mounting and curing of a liner 4 when having an access to the distal end of the liner.

In FIG. 6A, a part of the liner 4 in the vicinity of the distal end 7 is everted into itself. The liner 4 is closed at the distal end 7 by a liner plug (may be similar to the plug used for the bladder tube) and by inflating the liner 4, the liner will expand, and the everted part will become inverted as shown in FIGS. 6B and 6C, where the liner 4 is fully expanded.

Corresponding to the situation in the FIGS. 5A, 5B and 5C, the light head may be attached to the liner when the end of the liner is at the access opening of the inversion drum so that the end of the liner can be accessed and the light head (removably) attached to the liner.

The detachment of the light head from the liner corresponds to the detachment of the light head from the tube as explained in connection with FIGS. 5a-5c.

The distal end of the liner has not been cured, because the light head has been pulled back in the opposite direction, and not been so close to the distal end of the liner that the distal end of the liner has been cured.

When the liner has been cured, the part of the liner at the distal end of the liner, which has not been cured, is accessed via the manhole and cut off.

Now follows a set of points, which constitute aspects of the present invention which may be considered independently patentable and as such, the following sets form basis for possible future sets of claims:

1. An apparatus for curing a liner extending in a pipeline or at least in part in a branch pipeline,
    said liner including a substance such as a synthetic resin suitable for being curable by exposure to electromagnetic radiation,
    said apparatus comprising:
        an actuator constituting an electric, hydraulic or pneumatic actuator, said actuator including an actuator member,
        said actuator having an actuator axis substantially parallel to the axis of said main pipeline when said apparatus being in its intended operational position in said main pipeline,
        a light head having a light source for emitting electromagnetic radiation for curing said substance,
    said light head being connected to said actuator member,
    said actuator and actuator member configured for applying a force to said light head in a direction substantially parallel to said actuator axis for displacement of said light head in said pipeline, such that said substance is cured as said light head moves through said pipeline and exposes said substance to electromagnetic radiation.
2. The apparatus according to point 1, said branch pipeline being connected to a main pipeline at a junction.
3. The apparatus according to any of the preceding points, comprising a first cable constituting a guide cable interconnected to said light head or said actuator member such that when pulling said guide cable, said light head is guided away from said actuator axis for directing said light head into said branch pipe from said main pipeline when said apparatus is in its intended operational position in said main pipeline at said junction.
4. The apparatus according to any of the preceding points, said liner being a hat or T shaped liner.
5. The apparatus according to any of the preceding points, said actuator member being displaced with respect to said actuator when said actuator being actuated.
6. The apparatus according to any of the preceding points, said actuator and actuator member configured such that said light head moving parallel to said actuator axis when no pull being applied to said guide cable.
7. The apparatus according to any of the preceding points, comprising a second cable interconnected to said actuator member or said light head for stopping said light head from moving when said actuator being actuated.
8. An apparatus for curing a liner extending at least in part in a branch pipeline, such as a hat or T shaped liner,
    said liner including a substance such as a synthetic resin suitable for being curable by exposure to electromagnetic radiation,
    said branch pipeline being connected to a main pipeline at a junction,
    said apparatus comprising:
        a light head having a light source for emitting electromagnetic radiation for curing said synthetic resin,
        an inflatable housing having a connector at one end and a plug in the end opposite to the connector and a branch plug in a branch of said housing,
        a guide cable interconnected to said light head such that when pulling said guide cable, said light head is guided in a direction towards said branch plug when said apparatus is in its intended operational position in said main pipeline at said junction,
    said branch plug including an eye or loop for accommodating said guide cable such that said guide cable moves through said eye or loop when being pulled,
    said guide cable including a stop to be stopped by said eye or loop for pulling said branch plug out of said branch pipe.
9. The apparatus according to any of the preceding points, said actuator member being flexible for bending said actuator member at an angle up to 90 degrees with respect to said actuator axis.

10. The apparatus according to any of the preceding points, said actuator including a flexible rod constituting an inner tube or inner cylinder.
11. The apparatus according to any of the preceding points, said actuator including a barrel constituting an outer tube or outer cylinder for building fluid pressure for facilitating mechanical operation of said actuator member, said barrel having a barrel axis substantially parallel to said actuator axis.
12. The apparatus according to any of the preceding points, said light head being connected to said flexible rod.
13. The apparatus according to any of the preceding points, said actuator or barrel having a barrel connector for fluidl connection to a compressor during operation for supplying compressed fluid to said actuator or barrel.
14. The apparatus according to any of the preceding points, said barrel accommodating at least part of said flexible rod.
15. The apparatus according to any of the preceding points, said actuator having an extended state such that said flexible rod being fully extended from said barrel in said extended state.
16. The apparatus according to any of the preceding points, substantially parallel defining two directions not deviating from each other with more than 20 degrees, such as 10 degrees or 5 degrees.
17. The apparatus according to any of the preceding points, said actuator comprising a base member.
18. The apparatus according to any of the preceding points, said light head comprising a plurality of LED's for irradiating electromagnetic radiation.
19. The apparatus according to any of the preceding points, said flexible rod extending out from said barrel when pressure is applied to said actuator.
20. The apparatus according to any of the preceding points, comprising a housing having a connector at one end and a plug in the end opposite to the connector and a branch plug in a branch of said housing.
21. The apparatus according to any of the preceding points, said housing including a bladder.
22. The apparatus according to any of the preceding points, said actuator and said actuator member arranged such that when a force being applied to said actuator member, said light head is directed in a direction substantially parallel to the direction from said connector to said plug.
23. The apparatus according to any of the preceding points, said branch plug arranged to be positioned in said branch pipe during intended operation of said apparatus.
24. The apparatus according to any of the preceding points, said bladder having a wall of a material permeable to said electromagnetic radiation.
25. The apparatus according to any of the preceding points, said bladder being adapted for facilitating a pressure on said liner when said housing is inflated by a pressurized fluid such that said liner is pressed against a pipeline wall.
26. The apparatus according to any of the preceding points, comprising a compressor for supplying a fluid such as a compressed fluid to said actuator.
27. The apparatus according to any of the preceding points, said compressor supplying a fluid, such as a compressed fluid to said housing for inflating said housing.
28. The apparatus according to any of the preceding points, said connector and said plug being connected together by means of a stiffener for structurally stiffening said housing.
29. The apparatus according to any of the preceding points, said branch plug including an eye or loop for accommodating said cable, such that said cable moves through said eye or loop when being pulled.
30. The apparatus according to any of the preceding points, said cable including a stop to be stopped by said eye or loop for pulling said branch plug out of said branch pipe.
31. The apparatus according to any of the preceding points, comprising no more than two cables connected to said light head or said actuator member.
32. The apparatus according to any of the preceding points, comprising a single cable such as no more than one cable inside said housing, but outside said actuator.
33. The apparatus according to any of the preceding points, said stop having a size greater than said eye or loop.
34. The apparatus according to any of the preceding points, said stop being positioned on said guide cable between said light head and said eye or loop.
35. A system for curing a liner extending in a pipeline, said liner including a substance such as a synthetic resin suitable for being curable by exposure to electromagnetic radiation,
said liner having an open end,
said system comprising:
 a light head having a light source for emitting electromagnetic radiation for curing said synthetic resin,
 an inflatable housing, said light head being positioned inside said inflatable housing when said system is in its intended operational position in said pipeline,
 a connector for releasably connecting said light head with said inflatable housing at said open end of said liner, such that said light head is moved into said pipeline with said inflatable housing when said inflatable housing is inserted into said pipeline,
 a first cable interconnected to said light head for pulling said light head out of said liner when said light head is released from said liner.
36. The system according to point 35, comprising an inversion drum, said inversion drum having an exit for inverting said liner out of said exit, and
an opening such that when said liner is inverted a distance into said pipeline and said open end being at said opening, said opening is opened and said light head is releasably connected with said inflatable housing.
37. A system for curing a liner extending in a pipeline, comprising an inversion drum including said liner for positioning said liner in said pipeline,
said liner including a substance such as a synthetic resin suitable for being curable by exposure to electromagnetic radiation,
said liner having a proximal end and a distal end, said proximal end being closer to said inversion drum than said distal end when said liner being in its intended position in said pipeline,
said system comprising:
 a light head having a light source for emitting electromagnetic radiation for curing said synthetic resin,
 a connector for releasably connecting said light head with said liner at said distal end of said liner, such that said light head is moved into said pipeline with said distal end when said liner is inserted into said pipeline,
a first cable interconnected to said light head for pulling said light head out of said liner when said light head is released from said liner.
38. The system according to any of the preceding points 35-37, said inversion drum having an exit for inverting said liner out of said exit, and
an opening such that when said liner is inverted a distance into said pipeline and said distal end is at said opening, said opening is opened and said light head is releasably connected with said liner.
39. The system according to any of the preceding points 35-38, said first cable being a cable for supplying electricity to said light head or a wire or a rope.
40. The system according to any of the preceding points 35-39, said liner including an open end at said distal end when said liner is in its intended position in said pipeline, said liner being opened at said distal end preferably after said liner being cured.
41. The system according to any of the preceding points 35-40, said connector comprising an electric fuse.
42. The system according to any of the preceding points 35-41, said connector comprising a magnet.
43. The system according to any of the preceding points 35-42, said light head comprising a distal end and a proximal end, said distal end being closer to said open end than said proximal end.
44. The system according to any of the preceding points 35-43, said connector connected to said light head being closer to said proximal end than said distal end.
45. The system according to any of the preceding points 35-44, said connector including a second cable, said second cable extending across said light source for melting said second cable when said light source emits electromagnetic radiation, so that said light head is released.

LIST OF REFERENCE NUMBERS 1 pipeline
2 branch pipeline
3 manhole
3a first manhole
3b second manhole
4 liner
5 T-liner
6 proximal end of liner
7 distal end of liner
8 (power) cable
9 house
10 apparatus
11 actuator
13 actuator member
12a packing
14 barrel
15 light head
15a LED panel
15b transparent cover
16 proximal end of light head
17 distal end of light head
18 guide cable (first cable)
18a stop
20 inflatable housing
20a bladder tube
21 main housing
22 branch housing
24 connector
25 plug
26 branch plug
28 liner plug
29 stiffener
30 inversion drum
31 tube
32 tube coupling
F fracture

The invention claimed is:
1. An apparatus for curing a liner extending in a pipeline or at least in part in a branch pipeline, said liner including a synthetic resin suitable for being curable by exposure to electromagnetic radiation, said apparatus comprising:
an actuator constituting an electric, hydraulic or pneumatic actuator, said actuator including an actuator member,
said actuator having an actuator axis substantially parallel to the axis of said main pipeline
when said apparatus is in its intended operational position in said main pipeline,
a light head having a light source for emitting electromagnetic radiation for curing said substance,
said light head being connected to said actuator member,
said actuator and actuator member configured for applying a force to said light head in a direction substantially parallel to said actuator axis for displacement of said light head in said pipeline such that said substance is cured as said light head moving through said pipeline and exposing said substance to electromagnetic radiation.
2. The apparatus according to claim 1, said branch pipeline being connected to a main pipeline at a junction.
3. The apparatus according to claim 2, comprising a first cable constituting a guide cable interconnected to said light head or said actuator member such that when pulling said guide cable, said light head is guided away from said actuator axis for directing said light head into said branch pipe from said main pipeline when said apparatus is in its intended operational position in said main pipeline at said junction.
4. The apparatus according to claim 3, said actuator member being displaced with respect to said actuator when said actuator is actuated.
5. The apparatus according to claim 4, said actuator and actuator member being configured such that said light head is moving parallel to said actuator axis when no pull is applied to said guide cable.
6. The apparatus according to claim 5, comprising a second cable interconnected to said actuator member or said light head for stopping said light head from moving when said actuator being actuated.
7. The apparatus according to claim 1, said liner being a hat or T shaped liner.
8. The apparatus according to claim 1, said actuator member being flexible for bending said actuator member at an angle up to 90 degrees with respect to said actuator axis.
9. The apparatus according to claim 8, said actuator including a flexible rod constituting an inner tube or inner cylinder.
10. The apparatus according to claim 9, said actuator including a barrel constituting an outer tube or outer cylinder for building fluid pressure for facilitating mechanical operation of said actuator member, said barrel having a barrel axis substantially parallel to said actuator axis.

11. The apparatus according to claim 10, said actuator or barrel having a barrel connector for fluid connection to a compressor during operation for supplying compressed fluid to said actuator or barrel.

12. The apparatus according to claim 10, said barrel accommodating at least part of said flexible rod.

13. The apparatus according to claim 12, said actuator having an extended state such that said flexible rod is fully extended from said barrel in said extended state.

14. The apparatus according to claim 9, said light head being connected to said flexible rod.

15. An apparatus for curing a liner extending at least in part in a branch pipeline, such as a hat or T shaped liner, said liner including a substance such as a synthetic resin suitable for being curable by exposure to electromagnetic radiation, said branch pipeline being connected to a main pipeline at a junction, said apparatus comprising:

a light head having a light source for emitting electromagnetic radiation for curing said synthetic resin, an inflatable housing having a connector at one end and a plug in the end opposite to the connector and a branch plug in a branch of said housing, a guide cable interconnected to said light head such that when pulling said guide cable, said light head being guided in a direction towards said branch plug when said apparatus is in its intended operational position in said main pipeline at said junction, said branch plug including an eye or loop for accommodating said guide cable, such that said guide cable moves through said eye or loop when being pulled, said guide cable including a stop to be stopped by said eye or loop for pulling said branch plug out of said branch pipe, an actuator constituting an electric, hydraulic or pneumatic actuator, said actuator including an actuator member, said actuator having an actuator axis substantially parallel to the axis of said main pipeline, when said apparatus is in its intended operational position in said main pipeline, said actuator and actuator member configured for applying a force to said light head in a direction substantially parallel to said actuator axis for displacement of said light head in said pipeline such that said substance is cured as said light head moving through said pipeline and exposing said substance to electromagnetic radiation.

* * * * *